United States Patent [19]

Van Zeghbroeck

[11] Patent Number: 5,038,321

[45] Date of Patent: Aug. 6, 1991

[54] ERASEABLE ELECTRO-OPTIC STORAGE DISK, METHOD OF AND APPARATUS FOR RECORDING AND READING DATA THEREFOR

[75] Inventor: Bart J. Van Zeghbroeck, Richterswil, Switzerland

[73] Assignee: International Business Machines Corporation, Armonk, N.Y.

[21] Appl. No.: 577,833

[22] Filed: Aug. 27, 1990

Related U.S. Application Data

[63] Continuation of Ser. No. 126,802, Dec. 1, 1987, abandoned.

[30] Foreign Application Priority Data

Aug. 5, 1987 [EP] European Pat. Off. ........ 87106698.1

[51] Int. Cl.$^5$ ...................... G11C 13/00; G11B 11/00
[52] U.S. Cl. .................................. 365/106; 365/110; 365/114; 369/13
[58] Field of Search .................... 369/13, 14; 365/110, 365/114, 111, 106, 215

[56] References Cited

U.S. PATENT DOCUMENTS

| | | | |
|---|---|---|---|
| 3,855,583 | 12/1974 | Gudmundsen | 365/114 |
| 3,877,058 | 4/1975 | Cricchi | 357/23.5 |
| 3,950,738 | 4/1976 | Hayashi et al. | 365/114 |
| 4,549,287 | 10/1985 | Hatano et al. | 369/13 |
| 4,612,587 | 9/1986 | Kaneko et al. | 369/13 |
| 4,862,414 | 8/1989 | Kuehnle | 365/106 |

FOREIGN PATENT DOCUMENTS

| | | |
|---|---|---|
| 0049076 | 7/1982 | European Pat. Off. . |
| 84/03388 | 8/1984 | PCT Int'l Appl. . |

OTHER PUBLICATIONS

Yarive, The Optical Electronic Text Book, 3rd edition, Section 11.6, pp. 363-364.
Proceedings of the IEEE, vol. 58, No. 8, Aug. 1970, pp. 1207-1219, "The Metal-Nitride-Oxide-Silicon (MNOS) Transistor-Characteristics and Applications", by D. Frohman-Bentchkowski.
Applied Physics Letter 48(16), Apr. 21, 1986, pp. 1066-1068, "Noninvasive Sheet Charge Density Probe for Integrated Silicon Devices", by. H. K. Heinrich, D. M. Bloom, and B. R. Hemenway.
IBM Tech. Disclosure Bulletin, vol. 15, No. 4, Sep. 1972-pp. 1237/1238, "Electro-Optical Memory With Write Read and Erase Characteristics".
IBM Tech. Disclosure Bulletin, vol. 15, No. 11, Apr. 1973-pp. 3455/3456, "Non-Volatile Semiconductor Electro-Optical Memory Device".
IBM Tech. Disclosure Bulletin, vol. 20, No. 8, Jan. 1978, p. 2995, "Memory and Solar Cell".
Journal of Applied Physics, vol. 48, No. 12, Dec. 1977, pp. 5245-5261; G. E. Possin, "Bit Packing Density of the BEAMOS Target".

Primary Examiner—Stuart S. Levy
Assistant Examiner—Hoa Nguyen
Attorney, Agent, or Firm—F. E. Anderson

[57] ABSTRACT

An erasable electro-optic storage disk for use in focused laser beam operated data handling systems comprises a semiconductor substrate with a storage layer arranged on top of it that is capable of trapping charge carriers. Electric contacts are connected to the semiconductor substrate and to the storage layer, respectively. An energy barrier with associated depletion zone is formed in the substrate near the interface with the storage layer. Upon simultaneous application of a control voltage to the contacts and of a focused laser beam directed at a storage site, electron pairs are generated in the depletion zone, and charge carriers are transferred towards the interface. This causes a reduction of the depletion zone and thus of the voltage over the depletion zone, and an increase of the field in the storage layer, whereby charge carriers are injected into and trapped in the storage layer; method of recording, reading data and apparatus therefor.

29 Claims, 3 Drawing Sheets

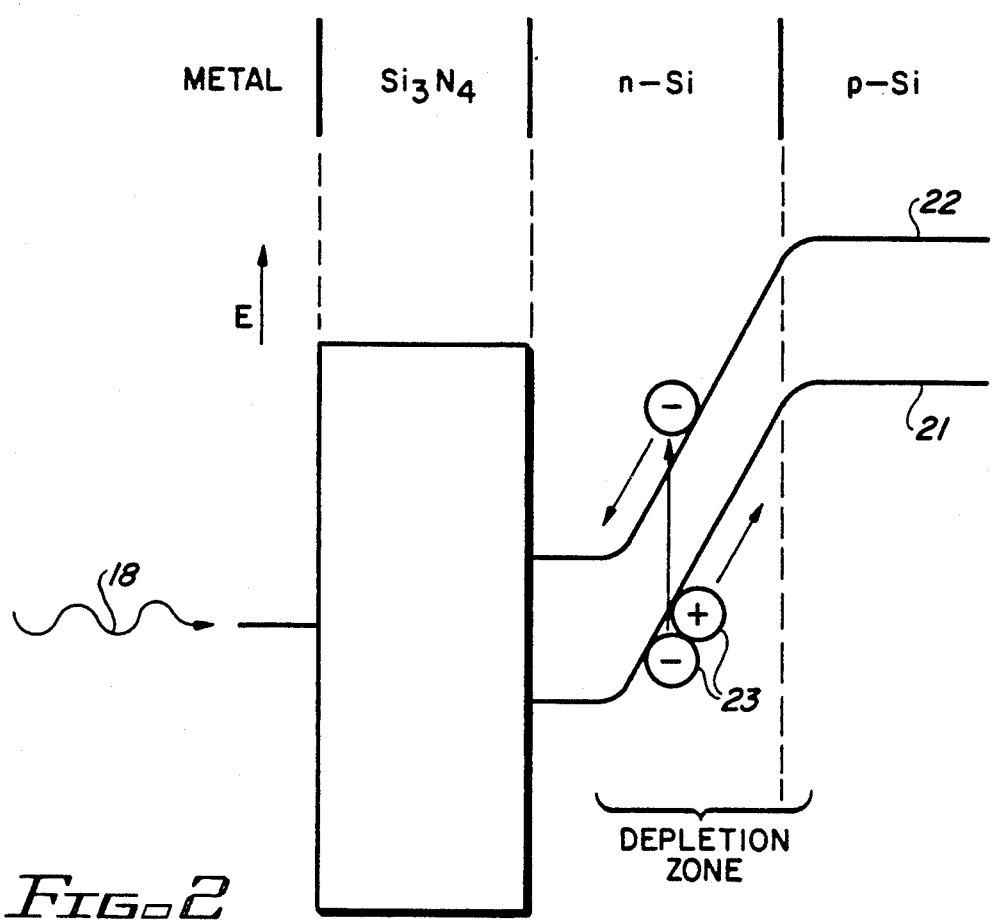
Fig. 2
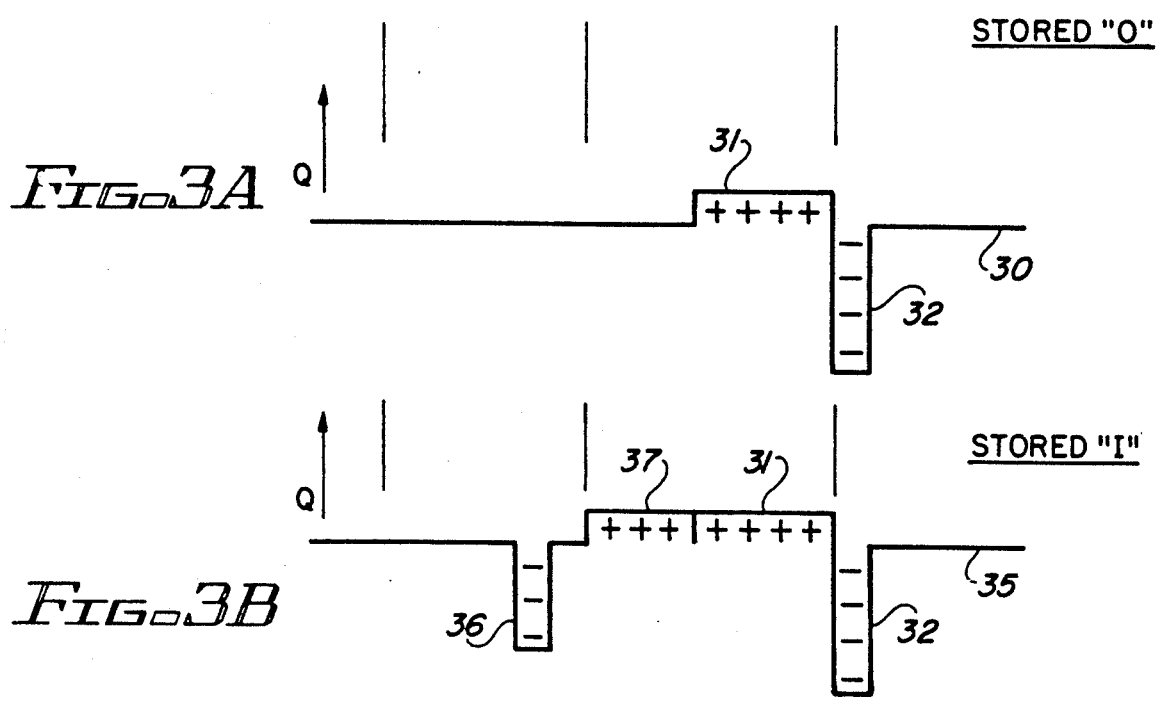
Fig. 3A
Fig. 3B

ERASEABLE ELECTRO-OPTIC STORAGE DISK, METHOD OF AND APPARATUS FOR RECORDING AND READING DATA THEREFOR

This patent application is a continuation of prior filed patent application Ser. No. 07/126,802, filed 12/1/87, now abandoned.

BACKGROUND OF THE INVENTION

1. Field of the Invention

The invention concerns an erasable electro-optic storage disk for use in focused laser beam operated data handling systems, and more particularly to a disk consisting of a semiconductor substrate with a storage layer on top of it that is capable of trapping charge carriers and having electric contacts connected to the semiconductor substrate and to the storage layer, respectively.

2. Description of the Related Art

Erasable optical disks are suitable for use in rotary disk data storages often found in data processing systems. They represent a promising alternative to the widely used magnetic disk. Further applications of optical disks are feasible, for instance, in digital optical computing systems where optical devices or arrays having storage capabilities are required to implement logic functions. Here, the optical disk is an alternative to the more commonly used liquid-crystal light valves.

At present, the most widely used storage medium in random access rotating memories is the magnetic disk. However, compact optical disks have become a competitive contender particularly in view of the potentially high data densities.

Size and shape of the bit storage sites are defined by the narrow focal point of a laser beam, making the round bit site only about one micron in diameter.

For erasable optical storage, there are currently two leading contenders: magneto-optic and phase-change technologies. Both techniques employ glass or plastic disks coated with thin films of storage media and use semiconductor laser diodes for recording. However, they differ markedly in the approach to writing and reading information.

Magneto-optic recording relies on heating from a laser and on an externally applied magnetic field to write data onto a disk coated with a thin film of magnetic material. Data are stored magnetically, the direction of magnetization defining the stored bit values.

In phase-change recording, a short burst of laser light converts a tiny spot on the storage media's highly reflective crystalline surface to the less reflective amorphous, or semicrystalline, state. This is done by rapidly heating the material to a temperature above its melting point and then abruptly quenching it, freezing it into the amorphous state.

Critical concerns about these technologies include media stability and reliability, cyclability, i.e., the number of times information can be rewritten, data access and transfer speeds, and the limited availability of lasers with sufficient power.

An alternative technique is provided by the basically different electro-optic storage devices which rely upon optical and electrical properties of the materials and structures used. Again, focused laser beams serve to address and to define the storage sites. Binary data are stored by trapping charge carriers in a continuous storage medium that may, e.g., consist of silicon nitride.

Trapping of charge carriers in silicon nitride has been studied extensively for application in non-volatile memories. The feasibility has, e.g., been demonstrated in an article "The Metal-Nitride-Oxide-Silicon (MNOS) Transistor—Characteristics and Applications" by D. Frohmann-Bentchkowsky in Proc. IEEE, Vol. 8, No. 8, August 1970, p. 1207–1219. Charge can be stored reliably and can be retained for very long periods of time.

Various storage systems employing devices having layers capable of trapping charge carriers have already been described. The following articles published in the IBM Technical Disclosure Bulletin (TDB) are representative of the state of the art:

"Electro-optical Memory with Write, Read and Erase Characteristics" (IBM TDB, Vol. 15, No. 4, September 1972, p. 1237/38). The disclosed structure comprises an electro-optical crystal with two dielectric films having different electron energy bandgaps deposited on one of the crystal surfaces. A light beam generates, in the crystal, a pattern of electrons. Upon application of an electric voltage, the electrons tunnel through the first thin insulator layer and become trapped between the interface state of the two dielectric layers. Since the trapped electrons cannot return, a permanent charge pattern is formed in the crystal. It induces a variation of the index of refraction and information can be read out using polarized light.

"Non-Volatile Semiconductor Electro-Optical Memory Device" (IBM TDB, Vol. 15, No. 11, April 1973, p. 3455/56). Here, the storage structure consists of a semiconductor with a thin silicon dioxide and a silicon nitride layer on top of it. Traps at the oxide-nitride interface become charged, representing stored data, at cell sites defined by a scanning light beam and transparent strip electrodes to which a positive voltage is applied. Data are read by scanning the device with a light beam. At sites with positively charged traps, a change in voltage is induced that can be detected.

"Memory and Solar Cell" (IBM TDB, Vol. 20, No. 8, Jan. 1978, p. 2995). This article describes a single storage cell consisting of a thick SeTe layer with an Al-oxide film and a transparent Al layer on top of it. The oxide layer functions as a capacitor in which a charge, representing data, can be stored when a light spot is focused on the storage site and contacts to the Se-Te and the Al-layer are simultaneously bridged by a low impedance connection. A light beam and a load are applied for reading: by detecting the presence or absence of current flow, which depends on the data stored, the cell conditions can be sensed.

These known systems suffer from deficiencies such as loss of data due to the large leakage or dark currents, charge spreading and electron recombination which are detrimental to reliable storage operations, particularly in high density systems. Also, fabrication processes are critical.

SUMMARY OF THE INVENTION

It is the main object of the present invention to provide an electro-optic disk for high density storage of digital data that operates highly reliably at low laser beam intensities, and that can be fabricated using well-established, uncritical processes.

The invention as claimed is intended to meet the above object and to remedy the drawbacks encountered with hitherto known structures. In a preferred embodiment, the disk consists of a silicon substrate with a silicon nitride layer and a transparent conductive electrode on top of it. In the substrate, an energy barrier, i.e., a p-n junction with associated depletion zone, is formed parallel and near the interface with the nitride layer. When a positive bias voltage is applied to the transparent electrode and a laser beam focused on a storage site, electron-hole pairs are generated in the depletion zone and electrons transfer toward the silicon-nitride interface whereby the depletion zone and the voltage across the junction are locally reduced and, consequently, the field in the nitride increased, so that electrons are injected and trapped in the nitride at the beam-defined storage site.

The advantages offered by the invention, and more particularly by the provision of an energy barrier (such as a p-n junction) near the semiconductor-nitride interface, are mainly that storage Write/Read/Erase operations become more reliable and that fabrication processes are less critical. These improvements are achieved in that:

the electric field distribution within the structure is, in essence, determined by the state of the p-n junction: in the absence of light, the junction or diode resistance is high and, consequently, the field within the storage layer, the nitride, is low; with a light beam applied to a storage site, the diode becomes conducting. This causes a substantial local increase of the field in the nitride whereby electron injection and trapping in the nitride at the beam-addressed storage site is markedly enhanced;

after writing data, i.e., after electrons have been trapped at selected storage sites, the p-n junction suppresses the leakage or dark current that otherwise tends to erase stored data if not rewritten in short time intervals; and in that the depletion zone of the junction, since located near the semiconductor-nitride interface, extends towards the interface thereby reducing the number of free carriers in that critical zone, this reduction in carriers resulting in reduced charge spreading and thus improved storage site resolution.

Further advantages are:

compared to magneto-optical and phase-change techniques, the required laser beam intensity is reduced by several orders of magnitude, and the employed silicon technology is well understood resulting in good reproducibility and high yield.

The foregoing and other objects, features, and advantages of the invention will be apparent from the following more particular description of preferred embodiments of the invention, as illustrated in the accompanying drawings.

BRIEF DESCRIPTION OF THE DRAWINGS

One way of carrying out the invention is described in detail below with reference to drawings illustrating a specific embodiment, and in which:

FIG. 3A and 3B are charge carrier concentration diagrams of the disk structure shown in FIG. 1 representing (A) a stored binary "0", and (B) a stored binary "1";

DESCRIPTION OF THE PREFERRED EMBODIMENT

The inventive electro-optical disk permits writing, reading and erasing of binary data using a focused laser beam to address and to define storage sites on the disk.

Figure 1:
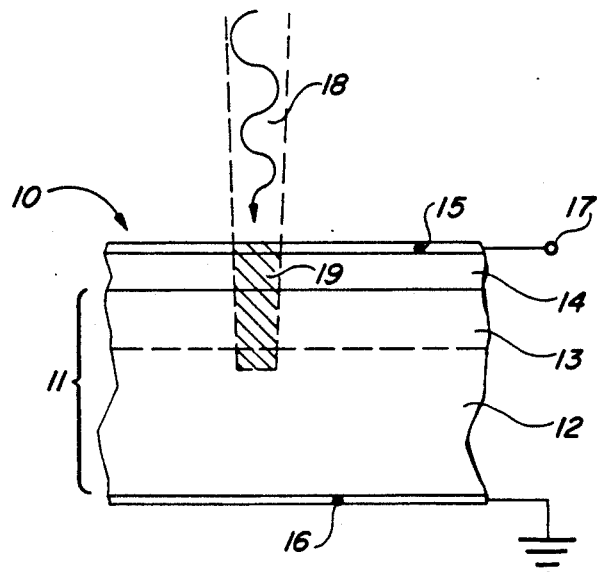
FIG. 1 is a schematic illustration of the cross-section of a disk structure produced in accordance with the teaching of the invention.

FIG. 1 illustrates an embodiment of the disk. Disk 10 is built on a silicon substrate 11 having a p-type body 12 (with a doping concentration of $10^{17}$ cm$^{-3}$, but typically in the range of $5 \times 10^{16}$ to $5 \times 10^{17}$ cm$^{-3}$) of uncritical thickness with a n-type (doping concentration $4 \times 10^{15}$ cm$^{-3}$, but typically in the range of $10^{15}$ to $10^{16}$ cm$^{-3}$) layer 13 on top of it. This epitaxially grown layer 13 has a thickness of 1 $\mu$m, but may typically vary from 0.5$\mu$m to 1.5$\mu$m. The p- and n-layers 12 and 13 form a p-n junction or diode with its associated depletion zone (with no free carriers existing in the thermal equilibrium state) extending to both sides of the physical p-n boundary. Because of the lower n-doping, the depletion zone extends substantially deeper into the n-layer 13 than into layer 12. As illustrated, a $Si_3N_4$ nitride layer 14 of 50 nm thickness is deposited on the upper surface of n Si layer 13, e.g., in a conventional chemical vapor deposition process (CVD). The structure is capped with an evaporated continuous transparent electrode layer 15 of 2 $\mu$m. thickness consisting of SnO to which, via terminal 17, a positive or negative bias voltage can be applied. Grounded back contact 16 consists of Al and provides an ohmic contact with the silicon substrate. Arrow 18 represents a focused laser beam that addresses and defines a storage site 19 and, with a positive bias voltage $V_W$ applied to terminal 17, initiates a write operation in the addressed storage site. A 0.8 $\mu$m wavelength GaAs laser diode having a power of only 8 $\mu$W and a correspondingly low energy density of $10^{-5}$ J/cm$^{-2}$ (at a spot size of approximately 2 $\mu$m diameter) is used. For the material and dimensions indicated, the laser beam will penetrate the structure down to the junction depletion zone where it will be fully absorbed thus providing for maximum efficiency.

For writing into the storage disk, a positive bias voltage $V_W$ of 15V is applied to transparent electrode 15. Simultaneously, the laser beam is directed at the storage site into which a binary value, e.g. a "1", is to be written. Initially, most of the applied voltage is across the reverse biased p-n junction or diode. Simulations have shown that, upon application of the 8 $\mu$W laser beam, $10^6$ or more electron-hole pairs are generated within a 4 m$^2$ area. This causes an almost complete destruction of the depletion zone and thus a substantial reduction of the diode resistance. The voltage across nitride layer 14 increases to a voltage high enough to trap charges in the nitride. According to the simulation, about 10% of the generated electrons get trapped causing a fixed voltage drop of about 4V across the nitride layer 14. The rest of the electron-hole pairs disappear due to recombination. After completion of the write operation, charge remains stored in the nitride which effects the depletion zone at the nitride - n-Si interface: The charge in the nitride is complemented by an equal but opposite charge that increases the depletion zone. In the described disk, the depletion zone then extends to the silicon-nitride interface, leaving virtually no free carriers in the n Si section of the storage site.

The additional, complementary positive charge in the barrier depletion zone can then be probed and recognized as representing a stored "1" in a subsequent read operation to be described below.

The other binary value, i.e. "0", is characterized by the absence of the trapped negative charge and, consequently, the absence of the complementary positive charge in the silicon depletion zone. The response of a storage site storing a "0" in a subsequent read operation will thus be different from that of a site containing a "1".

Figure 2A:
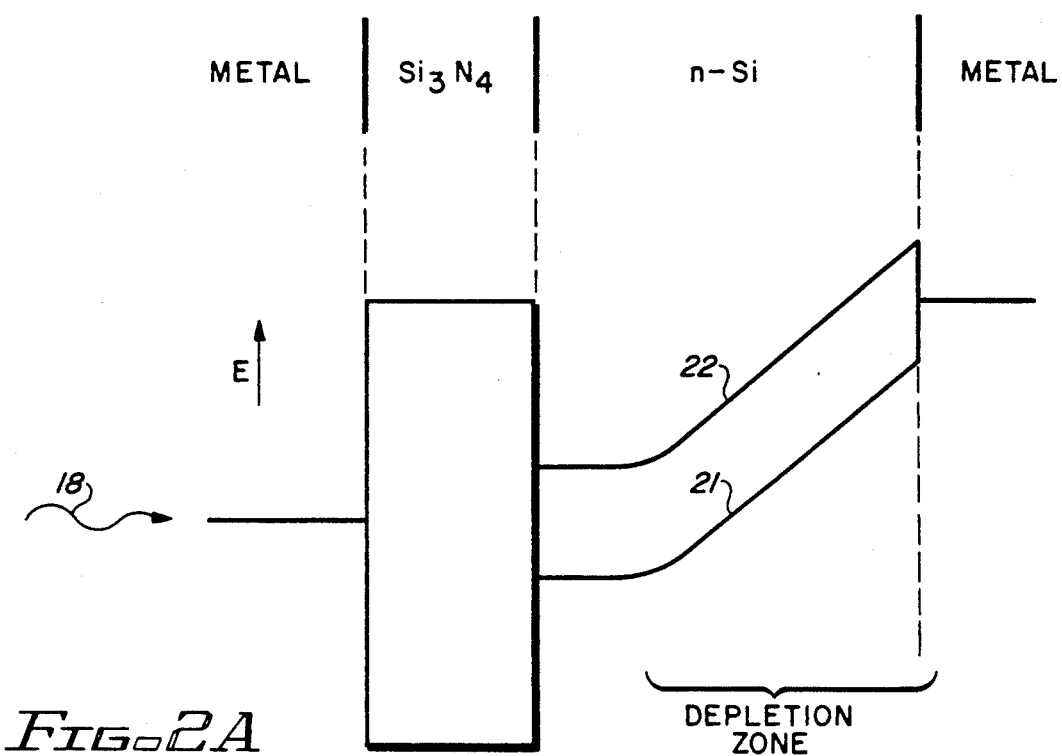
FIG. 2 is an energy diagram of the disk structure shown in FIG. 1, an energy diagram for a Schottky barrier is shown in FIG. 2A, and an energy diagram for a hetero-structure is shown in FIG. 2B.
Figure 2B:
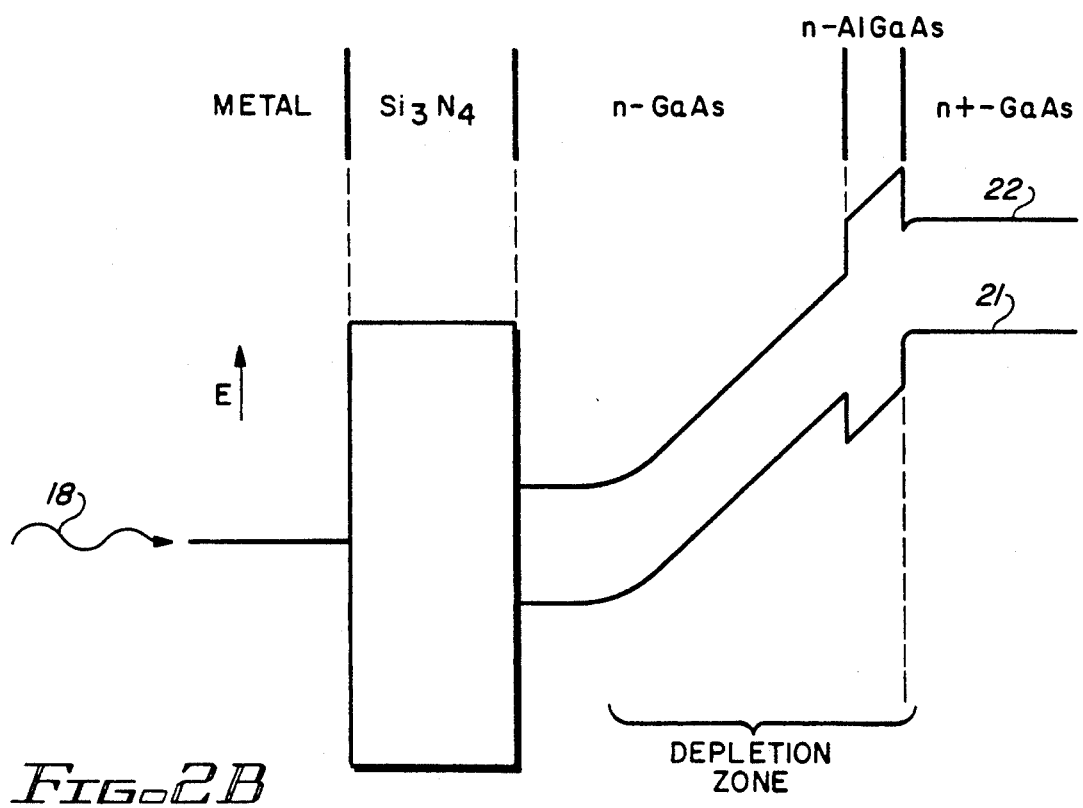

The Write process is illustrated in FIG. 2 and 3. FIG. 2 represents the energy (E) diagram of the disk structure of FIG. 1 when a positive voltage $V_W$ is applied to transparent top electrode 15. The diagram shows the bands of the metal electrode 15, the nitride layer 14 and the n- and p-silicon layers 13 and 12. The conduction band 22 and the valence band 21 in the depletion zone associated with the p-n junction show the typical characteristic, the "step" being determined by the inherent energy difference between p- and n-regions and the reverse bias voltage applied to electrode 14.

Upon application of laser beam 18, having a photon energy larger than the band gap of the silicon, electron hole pairs 23 are generated in the depletion zone and the charge carriers start moving as indicated by the arrows. As explained above, this reduces the depletion zone and the voltage over the p-n diode and causes an increase in the field over the nitride where electrons get trapped. As a result, charge is stored in the nitride layer at the position of the laser beam, i.e., at the beam-addressed storage site.

A further illustration of the result of a Write operation is given in FIG'S. 3A and 3B which show charge carrier concentration diagrams of storage sites of the disk of FIG. 1 with stored binary values of "0" and "1", respectively.

In FIG. 3A, the charge (Q) curve 30 illustrates the "initial" or "erased" state, defined as binary "0". Areas 31 and 32 represent the positively and negatively charged regions of the depletion zone formed at the physical p-n junction. Positive region 31 is deeper then the shallow negative region 32 because of its lower doping level ($4.10^{15}$ cm$^{-3}$ vs $10^{17}$ cm$^{-3}$).

In FIG. 3B, curve 35 illustrates the "charged" or binary "1" state. Area 36 represents the negative charge trapped in the nitride layer 14 after termination of a "write 1" operation whereas area 37 illustrates the additional positive charge in the depletion zone compensating for the charge stored in the nitride.

FIG. 3A and 3B clearly illustrate the electrical differences between storage sites having a "0" or a "1" stored. It is the absence or presence of the additional charge 37 (caused by electrons trapped in the nitride) that is probed in a subsequent Read operation.

Reading involves the sensing of a storage site to determine whether the additional positive charge (region 37 in FIG. 3B) is present in the depletion zone of the n Si layer 13. With a positive charge present, a stored "1" would be read out; otherwise a stored "0" is sensed.

Reading can be accomplished by probing a storage site with a focused and polarized beam of a 1.3 μm laser. The beam passes through transparent electrode 15, nitride 14 and through silicon layers 13 and 12 to the ground electrode 16 where the beam is reflected. The reflected beam again passes through the disk structure, now in the opposite direction. The polarized light beam undergoes a change in phase while passing through the structure. The degree of optical rotation depends on the charge concentration in the silicon. In reading from a storage site of the electro-optic disk herein described, the difference in phase of the in- and out-going beam depends on whether the additional positive charge region 37 (FIG. 3B) representing a binary "1" is present or not. Measurements of the degree of optical rotation of a light beam normally involve a comparison with a reference signal obtained from a reference site to increase accuracy and reliability. One such measurement system that can be employed in reading data from the inventive electro-optic disk has been disclosed in an article "Noninvasive Sheet Charge Density Probe for Integrated Silicon Devices" by H. K. Heinrich et al (Appl. Phys. Lett., Vol 48, 1986, p. 1066–68), hereby incorporated by reference.

For erasing data, the negative charge in the nitride layer of sites where a binary "1" is stored has to be removed. Erasing all storage sites on a disk can be accomplished by applying a negative bias voltage $V_E$ of $-15$ V to electrode 15 of the disk structure. The resulting reversed field across nitride layer 14 extracts the trapped electrons and thereby erases the stored "1" bits.

Selective erasing of e.g. storage sites forming a recording track on a disk in a rotating disk system can be done by applying a negative bias voltage $V_E$ of 14 V and by simultaneously focusing the laser beam used for write operations at the storage site or track to b erased.

After completion of an erase operation, all erased storage sites contain a binary "0".

From the above description, the more important features that distinguish the inventive electro-optic disk and its operation from earlier proposed structures are evident:

formation of an energy barrier in the semiconductor, the barrier height and the width of the associated depletion zone being controllable by applying bias voltages and light beams to provide for reliable write and read operations and serving to minimize dark currents thus enabling long time data storage;

barrier formation near the semiconductor-storage layer interface whereby the depletion zone can be controlled to extend to the interface thereby reducing possible free carrier transport and lateral spreading and improving storage site resolution; and laser beam intensity and wavelength and structural dimensions and materials can be chosen so that the write beam is fully absorbed after passing through the depletion zone, thereby providing for good efficiency, whereas the read beam passes unabsorbed through the whole disk structure thus permitting the probing of the charge density at selected storage sites.

Figure 4:
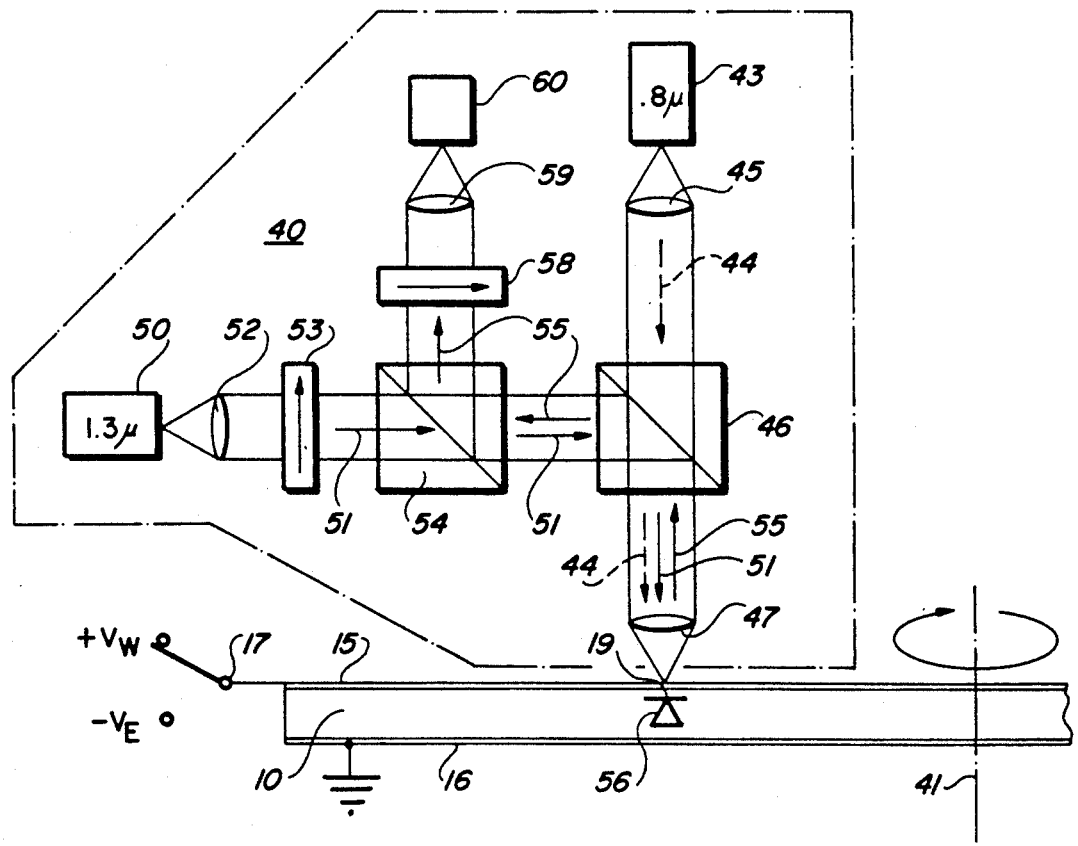
FIG. 4 is a schematic diagram of a disk storage system using the inventive disk structure and permitting Write, Read and Erase operations.

In FIG. 4, the essential electro-optic elements of a rotating disk storage system employing the disk of the present invention are shown. Disk 10 with transparent top electrode 15 and back contact 16 consists of a structure corresponding to that shown in FIG. 1. It rotates about axis 41 (mechanical features not shown). As in most rotary disk systems, data can be recorded in circular tracks on the disk surface.

In the situation indicated, the write/read head assembly 40 is in a position to write into or read from storage site 19 that is defined and addressed by a laser beam (44 for writing, 51 for reading) and located above the barrier in the semiconductor that is represented by the diode symbol 56.

For writing a binary "1" into site 19, a positive bias voltage $V_W$ is applied via terminal 17 to transparent electrode 15, the back contact 16 being grounded, and laser 43 emits a beam 44 of 0.8 μm wavelength which, after collimation in lens 45, passes through a beam splitter 46 and is then focused by lens 47 onto storage site 19. As explained in the foregoing, the simultaneous application of a positive bias voltage $V_W$ and a laser beam causes electrons to be trapped in the nitride at the storage site which, in turn, results in a local increase of positive charge in the semiconductor that can be sensed during a subsequent read operation.

For writing a binary "0" into a previously erased storage site, laser beam 44 is suppressed and the storage site remains in its "erased" state which represents a stored "0".

For reading information, "1" or "0", stored in site 19, the above referred to method of determining the difference in charge density is employed. A beam 51, emitted from a 1.3 μm laser 50, and collimated in lens 52 and polarized in polarizer 53, then passing through beam splitter 54, is reflected in beam splitter 46, focused by lens 47 and directed at site 19. Here, beam 51 is reflected after passing through the semiconductor layer where the carrier density depends on whether a "1" or a "0" is stored. In passing through the semiconductor material, the polarized light undergoes a phase shift the amount of which being dependent on the charge density, i.e. on the stored binary information. Reflected out-going beam 55 is diverted in beam splitters 46 and 54 and passes through polarization filter 58 to reach the photo detector plus analyzer circuitry 60. The polarization filter discriminates between beams stemming from storage sites having binary values of "1" or "0" stored since these differ in phase. Circuitry 60 is capable of reliably distinguishing between the different beam levels representing the different binary values.

The structure and operation of suitable charge density measurement systems based on the same concept as that just described, are known and described in greater detail for example in the above mentioned article "Non-invasive Sheet Charge Density Probe for Integrated Silicon Devices".

To erase all stored information on the disk, this operation corresponding to writing a "0" at all storage sites, a negative voltage $-V_E$ of 15V is applied to top electrode 15 of the disk. This reverses the field across the nitride storage layer thereby pushing the stored electrons out of the traps in the nitride.

When erasing of a single selected track on the disk is desired, this can be accomplished by applying a negative bias voltage $-V_E$ of smaller magnitude and by simultaneously directing the 0.8 μm write laser beam at the respective track.

With the described disk, the following storage system performance characteristics can be achieved:

Use of a low intensity/energy laser for writing: 8 μW corresponding to an energy density of $10^{-5}$ J/cm$^{-2}$ for a 2×2 μm storage site (compared to 20 mW and $10^{-2}$ J/cm$^{-2}$ for magneto-optic storage systems);

The storage site density is comparable to that of magneto-optic storage systems. With a storage site size of 2×2 μm, a density of 25-10$^6$ cm$^{-2}$ is already feasible. Higher densities can be obtained by choosing different wavelength lasers and different band gap semiconductor materials;

The access time is, as for most other rotating disk systems, determined by the speed limitation of the mechanical disk drive and transducer access mechanism.

While the invention has been described with respect to a preferred embodiment thereof, it will be understood by those skilled in the art that various changes in detail may be made therein without departing from the spirit, scope and teaching of the invention. For example, alternative structures, still based on the same concept, can be designed to serve particular requirements, e.g., by choosing different semiconductor materials, or by using different dimensions and doping concentrations or by changing or adding structural elements. For instance, the p-n junction forming the energy barrier near the semiconductor-nitride interface that represents a key element in the present invention, can be replaced by a Schottky barrier or a hetero-structure also forming a barrier with associated depletion zones that may be controlled as described herein above, and depicted in FIGS. 2A and 2B, respectively. Also, the storage layer 14, allowing for the trapping of charge carriers may not consist of silicon nitride but of a SiO2 layer with poly-Si islands embedded in which charges can be trapped.

In other alternative designs, a thin tunnel oxide layer between the storage layer and the semiconductor may be added, higher bandgap semiconductors and laser beams with shorter wavelength may be used for higher spatial density, or a thin transparent gold layer may be applied to reduce the transparent electrode resistance. Another potential alternative is to convert the herein described "stored electron" device into a "stored hole" device by reversing the barrier and the applied voltages.

Accordingly, the invention herein disclosed is to be limited only as specified in the following claims.

What is claimed is:

1. A selectively eraseable electro-optical storage disk for use in focused laser beam operated data handling system comprising:
   a semiconductor substrate;
   a storage layer consisting of Si3O4 position on one side of said semiconductor substrate, responsive to said focussed laser beam, said storage layer trapping charge carriers;
   only first and second electrical contacts; wherein
   said first electrical contact connected to one side of said semiconductor substrate; and
   said second electrical contact connected to the other side of said storage layer such that said storage layer directly contacts said substrate of a single interface, said second electrical contact being a transparent and continuous conductive layer; and
   an energy barrier including a depletion zone in said semiconductor substrate near the single interface with said storage layer,
   electron pairs generate in said depletion zone,
   said charge carriers transfer towards said single interface, and
   said charge carrier injected into and trapped in said storage in response to the simultaneous application of a control voltage to said first and second electrical contacts and of a first focused laser beam having a first wavelength to said semiconductor substrate and said storage layer, said charge carriers in said energy barrier changing the phase of a reflected light beam from a second focused laser beam having a second wavelength applied to said storage layer.

2. A storage disk as in claim 1, wherein said energy barrier is formed by a p-n junction.

3. A storage disk as in claim 1, wherein said energy barrier is formed by a Schottky-barrier.

4. A storage disk as in claim 1, wherein said energy barrier is formed by a hetero-structure.

5. A storage disk as in claim 1, wherein said depletion zone extends up to the interface between said semiconductor substrate and said storage layer.

6. A storage disk as in claim 2, wherein said p-n junction is formed by providing layers of n-type silicon and of p-type silicon.

7. A storage disk as in claim 6, wherein the doping concentration in said n-type layer is lower by at least one order of magnitude than the doping concentration in said p-type layer.

8. A storage disk as in claim 7, wherein the doping concentration in said n-type layer is between $10^{15}$ and $10^{16}$ cm$^{-3}$, and that in said p-type layer between $5 \times 10^{16}$ and $5 \times 10^{17}$ cm$^{-3}$.

9. A storage disk as in claim 6, wherein the thickness of said n-type layer is between 0.5 and 1.5 μm.

10. A storage disk as in claim 1, wherein said semiconductor substrate consists of (Si) and that of said storage layer of silicon ($Si_3N_4$).

11. A storage disk as claimed in claim 1, wherein said first focused laser beam is further used to selectively discharge previously trapped charge carriers.

12. A storage disk as claimed in claim 1, wherein said second focused laser beam non-invasively provides an indication of the presence of trapped charge carriers or the absence thereof.

13. The selectively eraseable electro-optic storage disk according to claim 1 wherein said first and second electrical contacts are the only contacts to said semiconductor substrate and said storage layer respectively.

14. The selectively eraseable electro-optic storage disk according to claim 13 wherein the magnitude of said control voltage is not greater than 20 volts.

15. An eraseable electro-optic storage disk the storing data upon the application of a first focused laser beam having a first wavelength and a control voltage having a first magnitude, for providing a read-out of stored data upon the application of a second focused laser beam having a second wavelength, and for selectively erasing stored data upon the application of the first focused laser beam and a control voltage having a second magnitude, comprising:
- a semiconductor substrate a first conductivity type having a first doping concentration;
- a storage layer of a second conductivity type, consisting of Si3N4 having a second doping concentration connected to and on said semiconductor substrate, responsive to said focussed laser beam, said storage layer trapping charge carriers;
- only first and second electrical contacts for receiving said control voltages, said first electrical contact connected to said semiconductor substrate, and said second electrical contact connected to said storage layer such that said storage layer directly contacts said substrate at a single interface, said second electrical contact being a transparent and continuous conductive layer, and
- an energy barrier including a depletion zone in said semiconductor substrate near the interface with said storage layer, electron pairs being generated in said depletion zone, said charge carriers being transferred towards said interface, and said charge carriers being injected into and trapped in said storage layer during said storing data with the first magnitude of the control voltage being less than 16 volts, the charge carriers changing the phase of said second focused laser beam reflected from said disk so as providing said data read-out, and the charge carriers in a predetermined location on said storage layer being discharged when selectively erasing data.

16. The eraseable electro-optic storage disk according to claim 15 wherein the said magnitude of the control voltage during selective erasure is substantially equal to negative 14 volts.

17. The eraseable electro-optic storage disk according to claim 15 wherein all the data stored on said electro-optic disk may be erased simultaneously.

18. The eraseable electro-optic storage disk according to claim 17 herein the concentration of the first doping concentration is at least 10 times greater than the concentration of the second doping concentration.

19. The eraseable electro-optic storage disk according to claim 15 wherein said energy barrier is formed by a p-n junction.

20. A method of writing data to and reading data from an erasable electro-optic storage disk, comprising the steps of:
- providing said electro-optic storage disk, wherein said disk comprising: a semiconductor substrate of a first conductivity type having a first doping concentration; a storage layer of a second conductivity type consisting of Si3N4 having a second doping concentration connected to and on said semiconductor substrate, said storage layer trapping charge carriers; only first and second electrical contacts for receiving control voltages, said first electrical contact connected to said semiconductor substrate and said second electrical contact connected to said storage layer such that said storage layer directly contacts said substrate at a single interface, wherein said second electrical contact being a transparent and continuous conductive layer; and an energy barrier including a depletion zone in said semiconductor substrate near the interface with said storage layer, electron pairs being generated in said depletion zone, said charge carriers being injected into and trapped in said storage layer;
- writing data to the storage disk by simultaneously applying a control voltage having a first magnitude and a first focussed laser beam having a first wavelength for generating said electron pairs in said depletion zone and causing said charge carriers to be transferred to said interface so that said charge carriers are injected into and trapped in said storage layer;
- reading data from the storage disk by applying a second focussed laser beam having a second wavelength onto said disk and detecting a reflected beam of said second focussed laser beam from said disk, wherein the charge carriers change the phase of said reflected beam.

21. The method according to claim 20 further comprising the step of selectively erasing data from the electro-optical storage disk by applying said first focussed laser beam to a predetermined location on said storage layer and a control voltage having a second magnitude to said disk, simultaneously.

22. The method according to claim 21 wherein the first and second magnitudes of said control voltages are less than 16 volts.

23. The method according to claim 20 wherein the reading step is non-invasive.

24. An apparatus for reading, writing and selectively erasing data on an electro-optic disk comprising:
an electrooptic disk comprising:
- a semiconductor substrate having a first doping concentration;
- a storage layer consisting of $Si_3N_4$ having a second doping concentration which is substantially less than the first doping concentration, connected to and on said semiconductor substrate, said storage layer trapping charge carriers
- only first and second electrical contacts; wherein said first electrical contact connected to said semiconductor substrate; and
- said second electrical contact connected to said storage layer, such that said storage layer contacts said substrate at a single interface, said second electrical contact being a transparent and continuous conductive layer; and
- an energy barrier including a depletion zone in said semiconductor substrate near the interface with said storage layer;

a write voltage;
an erase voltage;
means for providing a first focused laser beam having a first wavelength and means for selectively applying the write voltage to said first and second electrical contacts wherein electron pairs are generated in said depletion zone and charge carriers are transferred towards said interface, the charge carriers are injected into and trapped in said storage layer, and said providing means providing the first focused laser beam when said selectively applying means applying the erase voltage to said first and second electrical contacts for selectively erasing a predetermined location on said electro-optic disk; and means for providing a second focused laser beam having a second wavelength, said second wavelength having a different wavelength than said first wavelength, said second focused laser beam being reflected off said semiconductor substrate, the phase of said reflected second focused laser beam being changed by said charge carriers.

25. The apparatus according to claim 24 wherein the wavelength of the first wavelength is less than the wavelength of the second wavelength.

26. The apparatus according to claim 25 wherein the magnitude of the write voltage is greater than the magnitude of the erase voltage.

27. The apparatus according to claim 26 wherein the magnitude of the write voltage is less than 16 volts.

28. The apparatus according to claim 24 wherein the entire electro-optic disk may be erased simultaneously.

29. The apparatus according to claim 24 wherein said energy barrier is formed by a p-n junction.

* * * * *